United States Patent
Martucci et al.

(10) Patent No.: US 6,326,568 B2
(45) Date of Patent: *Dec. 4, 2001

(54) BLADE SWITCH ASSEMBLY FOR A CARD READER

(75) Inventors: Roberto Martucci, Montegrotto Terme Padova; Mario Previato, Padua; Gianni Zuin, Mestrino-Padova, all of (IT)

(73) Assignee: Molex Incorporated, Lisle, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/887,142

(22) Filed: Jul. 2, 1997

(51) Int. Cl.[7] .................................................. H01R 13/05
(52) U.S. Cl. ......................... 200/283; 200/535; 439/188; 439/630
(58) Field of Search ................. 200/16 R, 242, 200/245, 252, 253, 282, 283, 292, 160, 16, 52 R, 535, 532; 439/188, 260, 489, 630

(56) References Cited

U.S. PATENT DOCUMENTS

| | | | |
|---|---|---|---|
| 674,398 | * 5/1901 | Bower | 200/532 |
| 2,469,560 | * 5/1949 | Isserstedt | 200/535 X |
| 4,191,867 | * 3/1980 | Feaster | 200/16 R |
| 4,366,351 | * 12/1982 | Ditzig | 200/16 R |
| 4,900,273 | 2/1990 | Pernet | 439/630 |
| 5,013,255 | 5/1991 | Juret et al. | 439/260 |
| 5,330,363 | * 7/1994 | Gardner et al. | 439/188 |
| 5,331,123 | 7/1994 | Kimbell et al. | 200/52 R |
| 5,334,034 | 8/1994 | Reichardt et al. | 439/188 |
| 5,334,827 | 8/1994 | Bleier et al. | 235/492 |
| 5,370,544 | 12/1994 | Reichardt et al. | 439/188 |
| 5,463,210 | 10/1995 | Imura | 235/441 |
| 5,599,203 | 2/1997 | Broschard, III | 439/489 |
| 5,670,769 | 9/1997 | Pernet | 235/441 |
| 5,673,180 | 9/1997 | Pernet | 361/756 |
| 5,775,937 | 7/1998 | Bricaud et al. | 439/489 |
| 5,807,124 | 9/1998 | Bricaud et al. | 439/188 |
| 5,857,857 | * 1/1999 | Fukuda | 439/188 |
| 5,863,216 | * 1/1999 | Tsuji et al. | 439/489 |
| 5,871,368 | * 2/1999 | Erdner et al. | 439/188 |
| 5,924,881 | 7/1999 | Yasushi et al. | 439/188 |

FOREIGN PATENT DOCUMENTS

| | | | | |
|---|---|---|---|---|
| 0 516 943 B1 | * 4/1992 | (DE) | | H01K/13/71 |
| 0366513B1 | 10/1989 | (EP) | | H01R/13/405 |
| 0490860A1 | 12/1991 | (EP) | | H01R/23/70 |
| 0516943B1 | 4/1992 | (EP) | | H01R/13/71 |
| 0 516 943 B1 | * 8/1992 | (EP) | | H01R/13/71 |
| 0617488A1 | 3/1994 | (EP) | | H01R/23/70 |
| 0656597A1 | 6/1994 | (EP) | | G06K/7/06 |
| 0656598A1 | 6/1994 | (EP) | | G06K/7/06 |
| 8-7710 | 1/1996 | (JP) | | H01H/27/00 |
| WO 95/18421 | 7/1995 | (WO) | | G06K/7/06 |
| WO 96/29671 | 9/1996 | (WO) | | G06K/7/06 |

* cited by examiner

*Primary Examiner*—Renee Luebke
(74) *Attorney, Agent, or Firm*—Stacey E. Caldwell

(57) ABSTRACT

An electrical switch assembly includes a first switch contact having a base and an integral first contact arm folded over the base. The contact arm has an upwardly facing contact surface. A second switch contact arm includes a base and an integral spring contact arm folded into cantilevered position over the base. The spring contact arm has a distal end folded thereunder to define a downwardly facing contact surface opposing the upwardly facing contact surface and spaced therefrom in a normally open condition of the switch assembly.

10 Claims, 4 Drawing Sheets

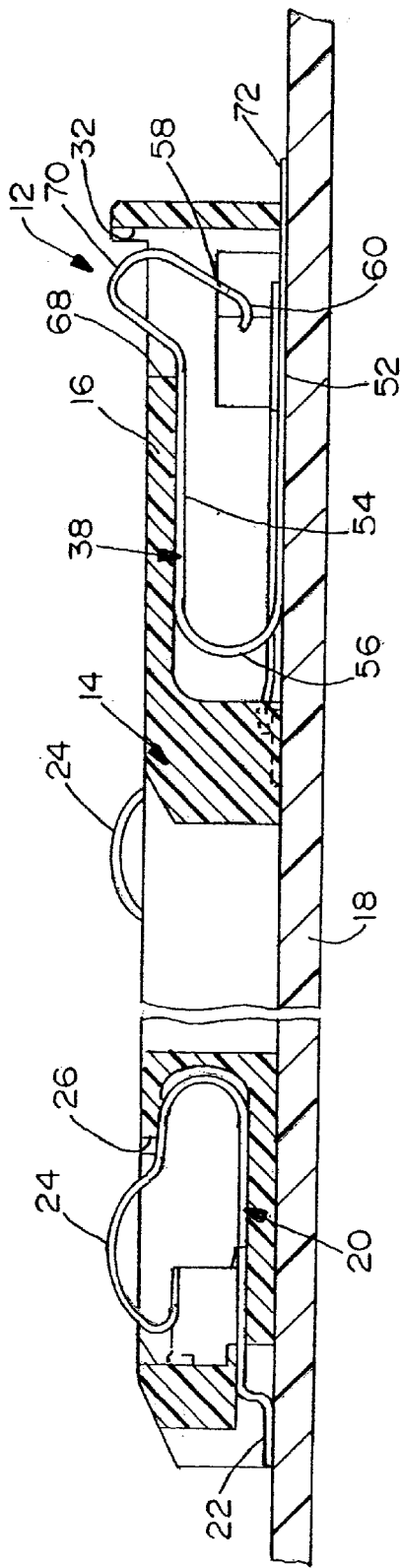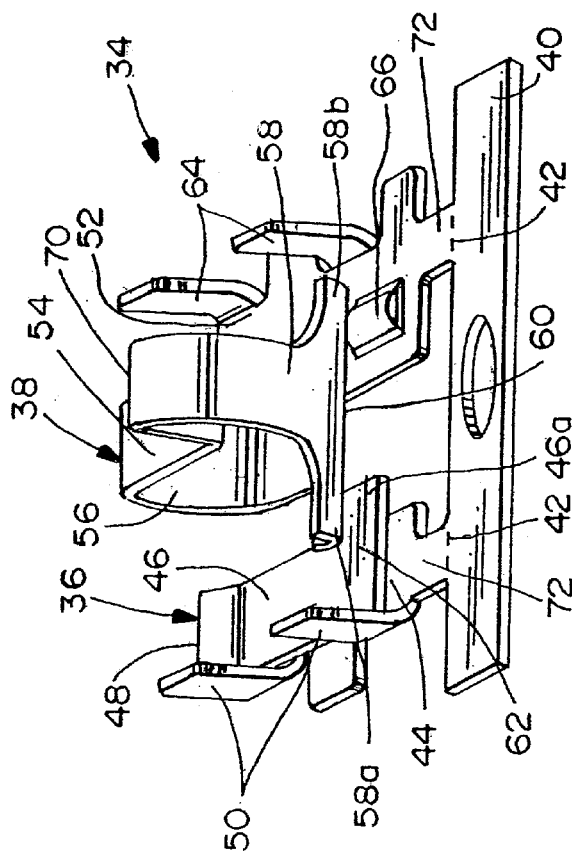

US 6,326,568 B2

BLADE SWITCH ASSEMBLY FOR A CARD READER

FIELD OF THE INVENTION

This invention generally relates to the art of electrical switches and, particularly, to a blade switch such as might be used in a card reader.

BACKGROUND OF THE INVENTION

Chip cards presently are used in a variety of applications and comprise a card of approximately the same size as a standard credit card. The card, itself, contains intelligence in the form of a memory circuit. A card reader or card connector is used to detect certain information stored on the card, and is used in applications such as banking machines, cable television decoders or descramblers, and a variety of other uses.

One type of chip card is identified as a "Subscriber's Identification Module" or "SIM" card which is a miniature chip card for use in small hand held devices such as pocket size cellular telephones. The SIM provides user identification in individual telephone handsets and the SIM card reader readily accommodates insertion and removal of the SIM to provide quick identification and easy access by a cellular telephone user.

A typical SIM or other chip card has exposed contact pads for matingly engaging underlying cantilevered contacts of a SIM connector or card reader. Since the card is inserted and removed manually, SIM connectors have had some inherent design difficulties.

One such difficulty in the use of chip cards and their respective readers involves contamination of the exposed contacts which can disintegrate the integrity and reliability of the electrical connection between the card and the underlying contacts. Since chip cards are typically carried by a person and are exposed to a wide range of contaminants, the card reader is exposed to all kinds of dirt or contaminants, particularly with mobile cellular telephone applications or automatic teller machines which involve outdoor use.

Another design difficulty in chip card readers involves the incorporation of means to detect the presence of the card into the card reader. Such detect means signals that the card is fully seated, and are typically in the form of end position or end-of-stroke switches incorporated into the card reader to detect complete insertion of the card. These end position switches can be either normally open switches or normally closed switches. When a change in state of the switch is detected, such as if the card is in its completely inserted position, the card reader is activated and data is transmitted from (or to) the chip card.

Because of the portable nature of chip cards and their respective readers and their known exposure to contaminants, known prior art connectors incorporating switches have used expensive and sometimes complicated designs to protect against contaminants and damage and to ensure the integrity and reliability of the system. There is therefore a need for a simple, yet reliable and economic switch design to incorporate in a chip card or SIM reader or connector. The present invention is directed to satisfying this need and solving the various problems discussed above.

SUMMARY OF THE INVENTION

An object, therefore, of the invention is to provide a new and improved electrical switch assembly of the character described.

In the exemplary embodiment of the invention, the switch assembly includes a first stamped and formed switch contact having a base and an integral first contact arm folded over the base. The contact arm has an upwardly facing contact surface. A second stamped and formed switch contact has a base and an integral spring contact arm folded into cantilevered position above the base. The spring contact arm has a distal end folded thereunder to define a downwardly facing contact surface opposing the upwardly facing contact surface and spaced therefrom in a normally open condition of the switch assembly.

With the above unique structural combination, movement of the spring contact arm of the second switch contact toward the first contact arm of the first switch contact causes engagement and relative wiping action between the contact surfaces. The wiping action functions to continually clean the contact surfaces by removing contaminants therefrom. In addition, the first and second switch contacts can be stamped from a common sheet of metal material with the contact surfaces being formed from the same side of the metal sheet. This facilitates economical and efficient selective plating of the contact surfaces.

As disclosed herein, the contact arms of the first and second switch contacts are disposed in a side-by-side relationship. The distal end of the spring contact arm has a transverse extension, with the downwardly facing contact surface on the underside of the extension so as to overlie the upwardly facing contact surface of the first contact arm. The base of the second switch contact has a raised abutment surface at a level coincident with the upwardly facing contact surface of the first contact arm.

The switch assembly also includes a housing having a top wall over the switch assembly. The top wall has an opening. The spring contact arm has an upwardly projecting actuator portion extending through the opening. The housing substantially encloses the switch assembly except for the upwardly projecting actuator portion. This protects the interior of the assembly from ingress of dirt and other contaminating material.

Lastly, the invention contemplates a method of fabricating the switch assembly from a sheet of conductive metal material to form the contact structural combination described above which facilitates easy selective plating of the contact surfaces.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 3 is a vertical section taken generally along line 3—3 of FIG. 2;

FIG. 4 is a perspective view looking at one end of the switch contact assembly, still connected to a carrier strip as during manufacture;

DETAILED DESCRIPTION OF THE PREFERRED EMBODIMENT

Figure 1:
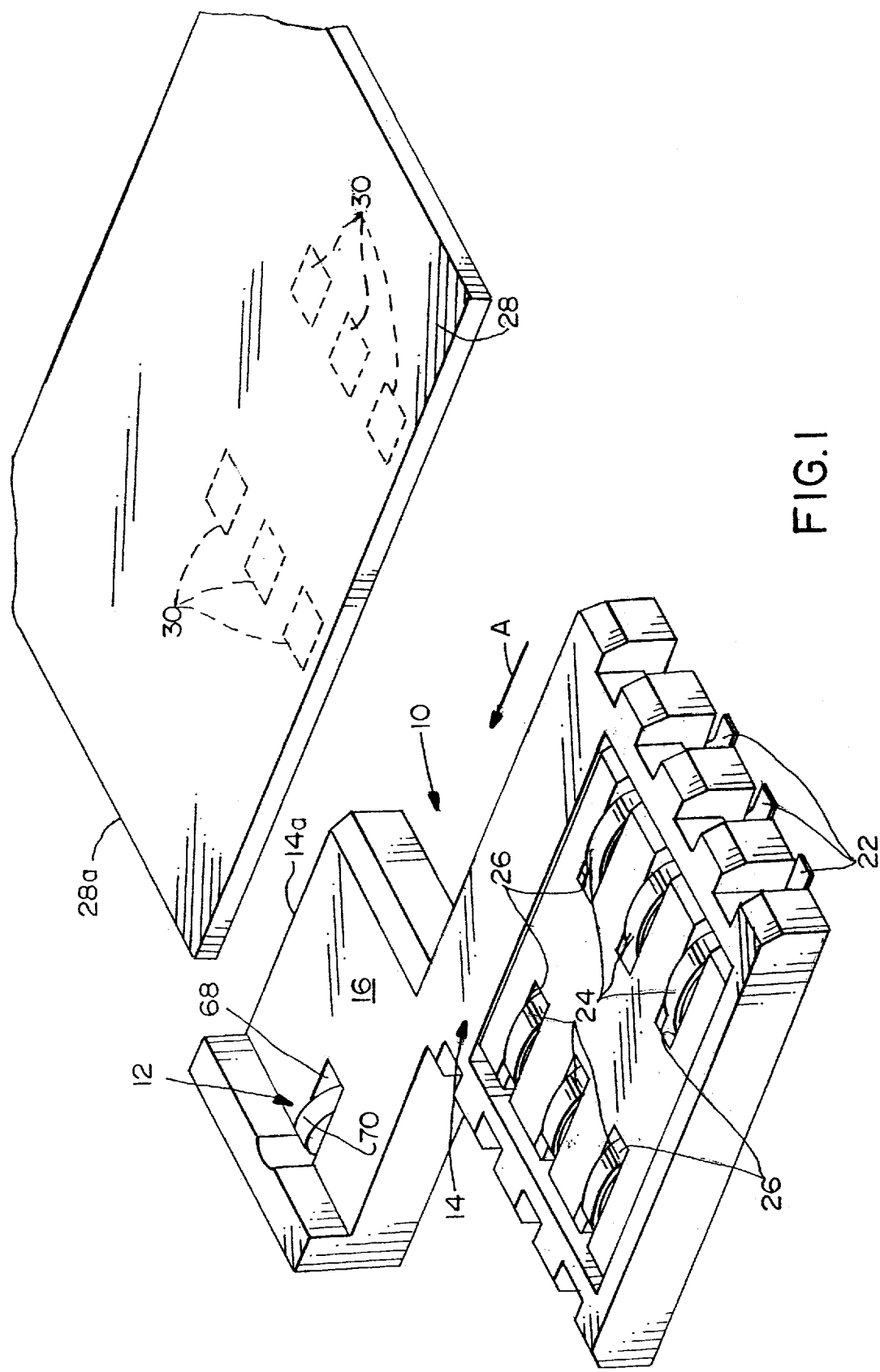
FIG. 1 is a perspective view of a card reader connector incorporating the electrical switch assembly of the invention, with a chip card or SIM spaced thereabove.
Figure 2:
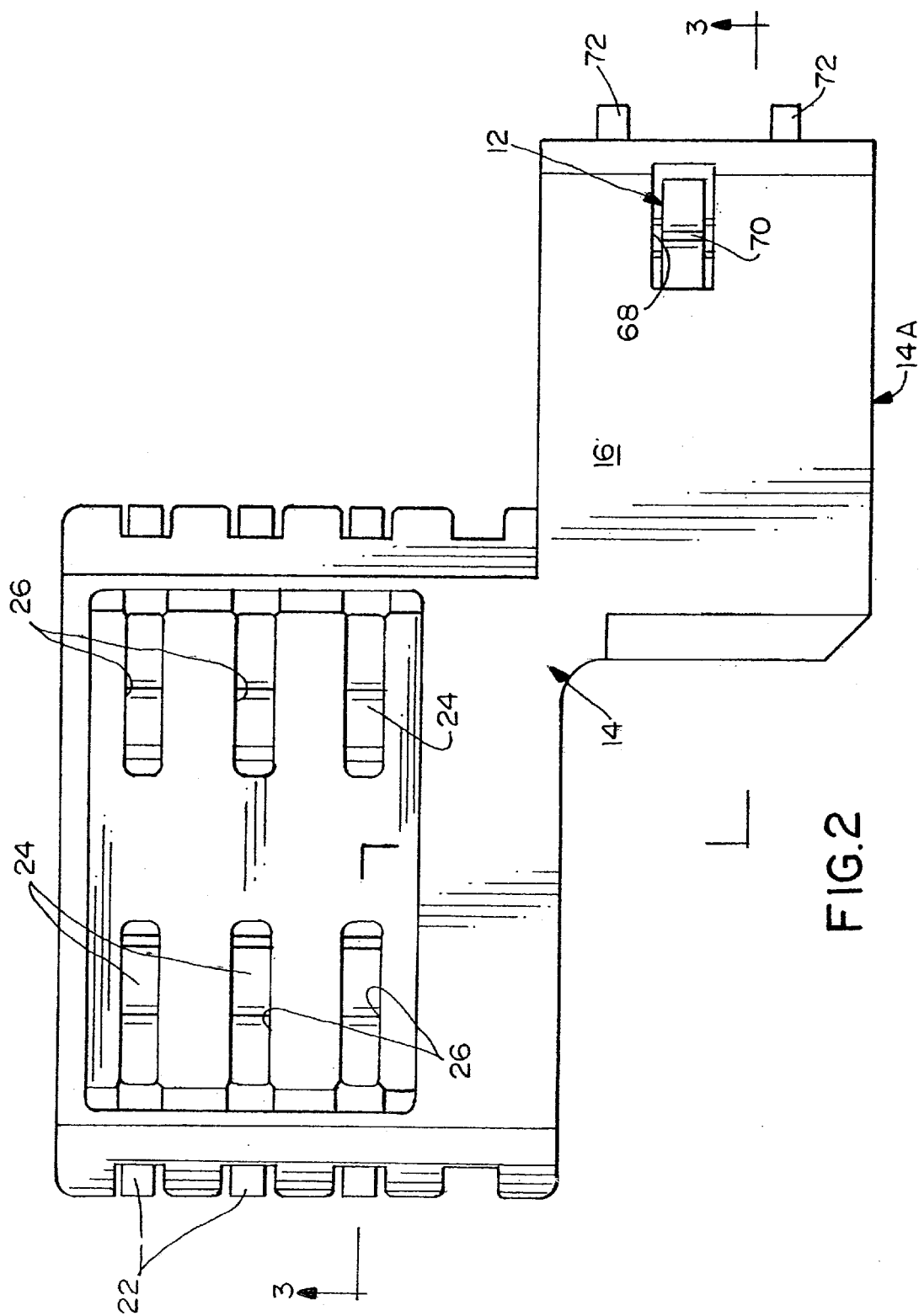
FIG. 2 is a top plan view of the connector and switch.

Referring to the drawings in greater detail, and first to FIGS. 1–3, the invention is incorporated in a chip card reader or SIM connector, generally designated 10, which includes an end of position switch assembly, generally designated 12. Connector 10 and switch assembly 12 are joined by a unitary housing, generally designated 14. The housing includes a top wall 16. The connector and switch assembly are adapted for mounting on a printed circuit board 18 as shown in FIG. 3.

Card reader connector 10 includes a plurality (six are shown) of information or signal contact, generally designated 20 (FIG. 3) mounted within housing 14. Each contact includes a foot portion 22 for connection, as by soldering, to appropriate circuit traces on printed circuit board 18. Each contact also has an upwardly bowed contact portion 24 which projects upwardly through openings 26 in housing 10. A chip card or SIM 28 has six contact pads 30 on the underside of the card adapted for engaging contact portions 24 of contacts 20. The contacts are stamped and formed of sheet metal material and contact portions 24 resiliently engage contact pads 30 of the chip card as the card depresses the contact portions.

Although all of the structural envelope surrounding card reader connector 10 is not shown in the drawings, it is known and can be understood that chip card 28 can be inserted into the envelope in the direction of arrow "A" (FIG. 1). During insertion, the card rides over the top of housing 14, depressing contact portions 24 of information contacts 20. When fully inserted or seated, contact pads 30 on the underside of the chip card are in alignment with contact portions 24 of the card reader. The reader, thereby, can read information from the card and, through printed circuit board 18, transfer that information to an appropriate intelligence-receiving device.

As stated above, end of position switches often are incorporated in card reader apparatus to ensure that the card is fully inserted. To that end, housing 14 has an offset portion 14A (FIG. 1) which has an upwardly projecting shoulder or wall 32 for engagement by a front edge 28a of chip card 28. In other words, when the chip card is inserted into the reader envelope in the direction of arrow "A", engagement of front edge 28a of the chip card with shoulder 32 of housing extension 14A determines full insertion of the card. As stated above, when so fully inserted, contact pads 30 on the underside of the card will be aligned with and depressingly engage resilient contact portions 24 of information contacts 20.

Figure 5:
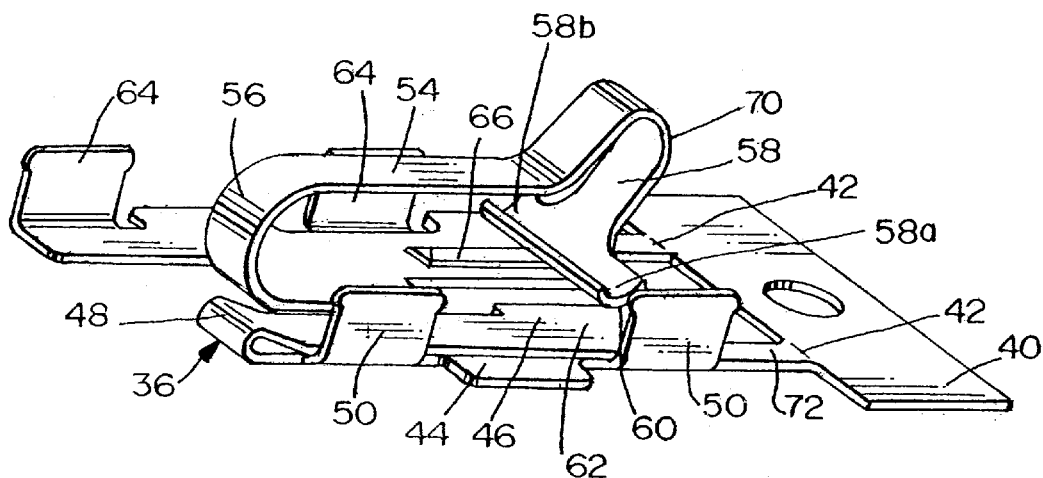
FIG. 5 is a perspective view of the switch contact assembly looking toward the left-hand side of FIG. 4.
Figure 6:
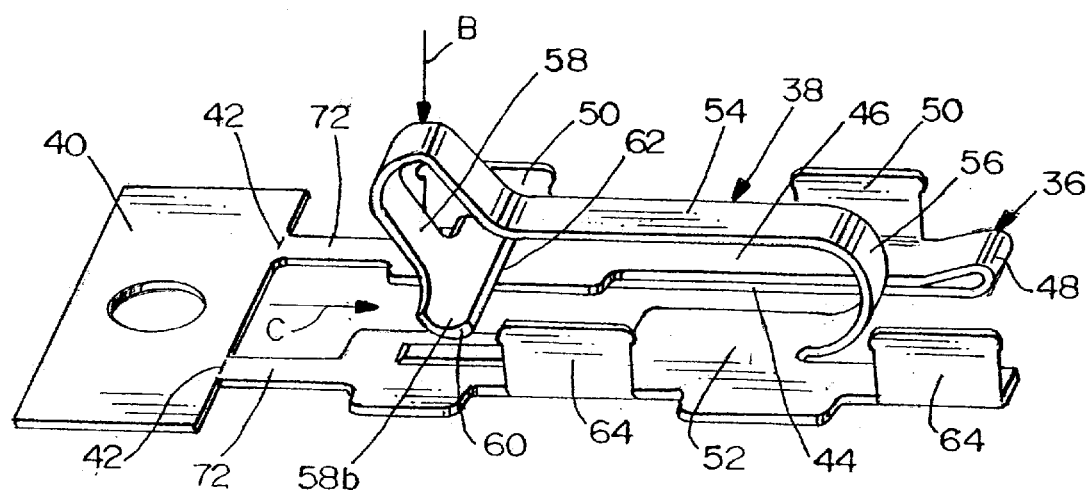
FIG. 6 is a perspective view of the switch contact assembly looking toward the right-hand side of FIG. 4.

Referring to FIGS. 4–6, the end of position switch is incorporated within offset housing extension 14A. FIGS. 4–6 show a contact assembly, generally designated 34, which comprises the major components of switch assembly 12. The contact assembly includes a first switch contact, generally designated 36, and a second switch contact, generally designated 38. Both switch contacts are stamped and formed out of a common sheet of conductive metal material. To that end, FIGS. 4–6 show the switch contacts still joined to a carrier strip 40, as during manufacture. After the switch contacts are fully stamped and formed, the contacts will be severed from carrier strip 40, as indicated by dotted lines 42.

More particularly, first switch contact 36 includes an elongated, planar base 44 and an integral contact arm 46. The contact arm is folded, as at 48, into juxtaposition over the top of base 44. The contact arm has an offset side extension 46a that projects toward the second switch contact 38. A pair of tabs 50 project upwardly from base 44 to assist in mounting first switch contact 38 in housing 14 (14A).

Second switch contact 38 also includes a planar base 52 and an integral spring contact arm 54. The base is coplanar with base 44 of first switch contact 36. The spring contact arm is folded, as at 56, into cantilevered position spaced above base 52. Spring contact arm 54 has a distal end 58 which is folded under the spring contact arm to define a downwardly facing contact surface 60 opposing an upwardly facing contact surface 62 on the top of contact arm 46 of first switch contact 36. The contact surfaces are shown spaced from each other in a normally open condition of the switch as shown in FIGS. 4–6. Like first switch contact 36, second switch contact 38 has a pair of tabs 64 projecting upwardly from base 52 to facilitate mounting the second switch contact within housing 14 (14A).

As best seen in FIG. 4, first and second switch contacts 36 and 38, respectively, are disposed in a side-by-side relationship. Distal end 58 of spring contact arm 54 of the second switch contact has a transverse extension 58a at one side thereof overlying the upwardly facing contact surface 62 of first switch contact 36. FIG. 4 also best shows that, with contact arm 46 being folded onto the top of base 44 of the first switch contact, a double thickness of metal material is formed. Consequently, a boss 66 is formed in base 52 of the second switch contact to define a raised abutment surface for engagement by a transverse extension 58b of the distal end of spring contact arm 54. Boss 66 preferably has approximately the same height as the upwardly facing contact surface 62 so that the distal end of spring contact arm 54 remains level when actuated.

Referring back to FIGS. 1 and 3 in conjunction with FIGS. 4–6, housing 14 (actually housing extension 14A) has an opening 68 in top wall 16. Spring contact arm 54 of second switch contact 38 has an upwardly projecting actuator portion 70 which extends through the opening. Therefore, when card 28 is fully inserted until its front edge 28a engages shoulder 32 of the housing, the card will engage actuator portion 70 and bias spring contact arm 54 downwardly until downwardly facing contact surface 60 of second switch contact 38 engages upwardly facing contact surface 62 of first switch contact 36.

As best seen in FIG. 3, housing 14 (14A) substantially encloses switch contact assembly 34, including movable second switch contact 38, except for the upwardly projecting actuator portion 70 of the second switch contact. This protects the switch within the interior of the housing and minimizes the ingress thereinto of dirt or other contaminants. That is, the whole of the switch contact assembly 34 (FIGS. 4–6) is encased within the housing except for actuator portion 70 of movable switch contact 38.

When switch contacts 36 and 38 are severed from carrier strip 40, as at 42 and described above, coplanar feet 72 are left projecting from bases 44 and 52 of the switch contacts. These feet can be used as solder tails for connection to appropriate circuit traces on printed circuit board 18.

From the foregoing, it can be understood that when force is applied to actuator portion 70 at the distal end of spring contact arm 54 of switch contact 38, the end of the spring contact moves downwardly in the direction of arrow "B" (FIG. 6). During this downward action, after downwardly facing contact surface 60 engages upwardly facing contact surface 62 of switch contact 38, a wiping action is created between the opposing contact surfaces in the direction of arrow "C" (FIG. 6). This facilitates removing contaminants or deposits which might otherwise build up on the opposing contact surfaces.

It can be understood that the upwardly facing contact surface 62 on the top of contact arm 46 of first switch contact 36 and the bottom contact surface 60 at the distal end of second switch contact 38 are on the same (bottom) side of the sheet metal material from which the switch contacts were stamped and formed. Therefore, with the unique configuration of the switch assembly, selective plating can be carried out in a limited area of only one side of the sheet metal material prior to forming the switch contacts, resulting in the opposing contact surfaces of the switches in the final assembly being plated without wasting expensive plating material.

Lastly, it should be understood herein and in the claims hereof that such terms as "top", "bottom", "upwardly", "downwardly" and the like have been used for illustration purposes only, in order to provide a clear and understandable description and claiming of the invention. Such terms are not in any way to be construed as limiting, because the switch assembly and contact assembly of the invention are omnidirectional in use as can be understood by their various uses in portable, hand held instruments.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An electrical switch assembly, comprising:
   a first switch contact stamped and formed of sheet metal material and including a first planar base and an integral first contact arm folded over and substantially parallel to the first planar base, the contact arm having an upwardly facing contact surface; and
   a second switch contact stamped and formed of sheet metal material and including a second planar base substantially coplanar with the first planar base and an integral spring contact arm folded into cantilevered position above and substantially parallel to the second planar base, the spring contact arm having a distal end folded thereunder to define a downwardly facing contact surface opposing said upwardly facing contact surface and spaced therefrom in a normally open condition of the switch assembly;
   whereby the first and second switch contacts can be stamped from a common sheet of metal material with said contact surfaces being formed on a single surface of the sheet to facilitate selective plating of the contact surfaces.

2. The electrical switch of claim 1 wherein the contact arms of said first and second switch contacts are disposed in a side-by-side relationship, and the distal end of said spring contact arm has a transverse extension, with the downwardly facing contact surface being on the underside of the extension so as to overlie the upwardly facing contact surface of the first contact arm.

3. The electrical switch of claim 2 wherein the second planar base of said second switch contact arm has a raised abutment surface at a level coincident with the upwardly facing contact surface of the first contact arm.

4. The electrical switch of claim 1, including a housing having a top wall over the switch assembly, the top wall having an opening, and the spring contact arm having an upwardly projecting actuator portion extending through the opening, with the top wall substantially covering the switch assembly except for said upwardly projecting actuator portion.

5. An electrical switch assembly, comprising:
   a first switch contact stamped and formed of sheet metal material and including an upwardly facing contact surface; and
   a second switch contact stamped and formed of sheet metal material and including a planar base and an integral spring contact arm folded into cantilevered position above and substantially parallel to the base, the spring contact arm having a distal end folded thereunder to define a downwardly facing contact surface opposing said upwardly facing contact surface and spaced therefrom in a normally open condition of the switch assembly.

6. The electrical switch of claim 5 wherein the contact arms of said first and second switch contacts are disposed in a side-by-side relationship, and the distal end of said spring contact arm has a transverse extension, with the downwardly facing contact surface being on the underside of the extension so as to overlie the upwardly facing contact surface of the first contact arm.

7. The electrical switch of claim 6 wherein the second planar base of said second switch contact arm has a raised abutment surface at a level coincident with the upwardly facing contact surface of the first contact arm.

8. The electrical switch of claim 5, including a housing having a top wall over the switch assembly, the top wall having an opening, and the spring contact arm having an upwardly projecting actuator portion extending through the opening, with the top wall substantially covering the switch assembly except for said upwardly projecting actuator portion.

9. An electrical switch assembly for detecting a position of a card, comprising:
   a housing having a top wall with an opening therein;
   a first switch contact including a first base portion fixed in the housing and a first integral contact arm folded over the first base portion; and
   a second switch contact including a second base portion fixed in the housing, a cantilevered spring contact arm formed above the second base portion, and an abutment surface projecting above the second base portion, the cantilevered spring contact arm including a distal end having a contact portion movable into and out of engagement with the integral contact arm of the first switch contact, the contact portion of the cantilevered spring contact arm engaging both the abutment surface and the first integral contact arm with a wiping action during engagement with the first integral contact arm such that the distal end of the cantilevered spring contact arm remains level when engaging the first integral contact arm, the cantilevered spring contact arm further having a unitarily formed actuator portion near the distal end thereof projecting through the opening in the top wall of the housing for direct actuation by the card, wherein the base portions of the first and second switch contacts are disposed in a side-by-side relationship and their longitudinal axes extend generally parallel to one another and generally parallel to and spaced below the top wall of the housing, and
   said top wall of the housing enclosing the switch assembly except for said unitarily-formed actuator portion projecting through the opening in the top wall.

10. The electrical switch of claim 9 wherein said cantilevered spring contact arm is stamped and formed of sheet metal material, and said actuator portion comprises an outwardly bowed portion of the arm.

* * * * *